(12) United States Patent
Helbing et al.

(10) Patent No.: US 8,013,895 B2
(45) Date of Patent: Sep. 6, 2011

(54) OPTICAL MOTION SENSING

(75) Inventors: Rene Helbing, Palo Alto, CA (US);
Todd Sachs, Palo Alto, CA (US);
Michael J. Brosnan, Fremont, CA (US)

(73) Assignee: Avago Technologies General IP (Singapore) Pte. Ltd., Singapore (SG)

( * ) Notice: Subject to any disclaimer, the term of this patent is extended or adjusted under 35 U.S.C. 154(b) by 1093 days.

(21) Appl. No.: 11/500,077

(22) Filed: Aug. 7, 2006

(65) Prior Publication Data

US 2008/0030586 A1 Feb. 7, 2008

(51) Int. Cl.
*H04N 5/228* (2006.01)

(52) U.S. Cl. ............ 348/208.4; 348/345; 348/349; 348/352

(58) Field of Classification Search .......... 348/208.4, 348/208, 348, 349, 352
See application file for complete search history.

(56) References Cited

U.S. PATENT DOCUMENTS

| | | | |
|---|---|---|---|
| 4,340,731 A | 7/1982 | Colombo | |
| 5,371,539 A * | 12/1994 | Okino et al. | 348/208.6 |
| 5,563,652 A * | 10/1996 | Toba et al. | 348/207.99 |
| 5,786,847 A | 7/1998 | Katayama | |
| 5,977,535 A | 11/1999 | Rostoker | |
| 6,744,931 B2 | 6/2004 | Komiya | |
| 7,558,320 B2 * | 7/2009 | Winder et al. | 375/240.12 |
| 7,609,293 B2 * | 10/2009 | Faulkner et al. | 348/208.6 |
| 2001/0021224 A1 * | 9/2001 | Larkin et al. | 375/240.16 |
| 2004/0028137 A1 * | 2/2004 | Wyn-Harris et al. | 375/240.17 |
| 2004/0212677 A1 | 10/2004 | Uebbing | |
| 2005/0094154 A1 * | 5/2005 | Baney et al. | 356/499 |
| 2006/0043515 A1 | 3/2006 | Ford | |
| 2006/0088191 A1 | 4/2006 | Zhang et al. | |
| 2006/0131485 A1 | 6/2006 | Rosner et al. | |
| 2006/0228049 A1 * | 10/2006 | Gensolen et al. | 382/309 |
| 2007/0046782 A1 * | 3/2007 | Helbing et al. | 348/208.4 |
| 2007/0242900 A1 * | 10/2007 | Chen et al. | 382/294 |
| 2008/0030586 A1 * | 2/2008 | Helbing et al. | 348/208.4 |

FOREIGN PATENT DOCUMENTS

| | | |
|---|---|---|
| JP | 09329818 | 12/1997 |
| JP | 2002/203247 | 7/2002 |

* cited by examiner

*Primary Examiner* — David L Ometz
*Assistant Examiner* — Antoinette T Spinks

(57) ABSTRACT

Optical motion sensing systems and methods are described. In one aspect, light from subfields of a scene is focused onto respective capture areas of a focal plane. Successive sets of contemporaneous local images are captured from the focused light. Respective saliency measures are derived from respective ones of the local images. Respective local motion measures are determined from comparisons of corresponding ones of the local images in ones of the contemporaneous local image sets. A respective global motion measure is produced for each of the contemporaneous local image sets based on the respective ones of the local motion measures and the respective ones of the saliency measures.

20 Claims, 6 Drawing Sheets

OPTICAL MOTION SENSING

CROSS-REFERENCE TO RELATED APPLICATIONS

This application relates to the co-pending U.S. patent application Ser. No. 11/212,460, filed Aug. 26, 2005, by Rene Helbing et al., entitled "Method and System for Determining the Motion of an Imaging Apparatus," which is incorporated herein by reference.

BACKGROUND

Motion sensing is used for a wide variety of different applications, including image stabilization applications, security applications, moving object tracking applications, and human-machine interface applications. Motion sensors typically generate output signals that are indicative of movement of the motion sensor in relation to a reference frame. Exemplary motion sensing devices are inertial motion sensors and optical motion sensors.

Inertial motion sensors typically include an inertial sensor that generates an output signal that is indicative of acceleration of the inertial sensor in relation to an inertial reference frame and a signal processor that converts the output signal into velocity or displacement information. The inertial sensor may include any type of inertial sensing device, including an accelerometer-based inertial sensing device and a gyroscope-based inertial sensing device. Accelerometers sense and respond to translational accelerations, whereas gyroscopes sense and respond to changes in rotational rates. For both accelerometer-based inertial sensing devices and gyroscope-based inertial sensing devices, the signal processor determines velocity information and the displacement information by integrating the output signals generated by the inertial sensors over time.

Optical motion sensors typically include an image sensor that captures images of a scene and an image processor that detects motion in the captured images. The image sensor captures images at a rate that is fast enough so that sequential pictures of the scene overlap. The image processor detects scene changes based on comparisons between successive ones of the captured images. In some motion tracking approaches, the image processor identifies texture or other features in the images and tracks the motion of such features across successive images by determining the direction and distance by which the identified features are shifted or displaced.

In general, the motion that is reported by inertial motion sensors is due to the acceleration of the inertial motion sensors in relation to a fixed inertial reference frame. The motion that is reported by optical motion sensors, on the other hand, may be caused by motion of the image sensor in relation to the scene or by motion of objects appearing in the scene. In order to produce accurate motion sensing results, there oftentimes is a need to distinguish motion of the image sensor from motion of objects appearing in the imaged scene. In some applications, such as optical computer mouse applications, the scene (e.g., a tabletop surface) is fixed and, therefore, the motion reported by the optical motion sensor can be assumed to be due to movement of the optical motion sensor or noise. In many other applications, including image stabilization applications, mobile object tracking applications, and three-dimensional video game controller applications, the imaged scene typically does not contain a fixed reference surface.

What are needed are optical motion sensing systems and methods that are capable of distinguishing between movements of the optical motion sensing system and movements of objects appearing in the imaged scene, especially is cases in which the imaged scene does not contain a fixed reference surface.

SUMMARY

In one aspect of the invention light from subfields of a scene is focused onto respective capture areas of a focal plane. Successive sets of contemporaneous local images are captured from the focused light. Respective saliency measures are derived from respective ones of the local images. Respective local motion measures are determined from comparisons of corresponding ones of the local images in ones of the contemporaneous local image sets. A respective global motion measure is produced for each of the contemporaneous local image sets based on the respective ones of the local motion measures and the respective ones of the saliency measures.

Other features and advantages of the invention will become apparent from the following description, including the drawings and the claims.

DETAILED DESCRIPTION

In the following description, like reference numbers are used to identify like elements. Furthermore, the drawings are intended to illustrate major features of exemplary embodiments in a diagrammatic manner. The drawings are not intended to depict every feature of actual embodiments nor relative dimensions of the depicted elements, and are not drawn to scale.

I. Overview

Figure 1:
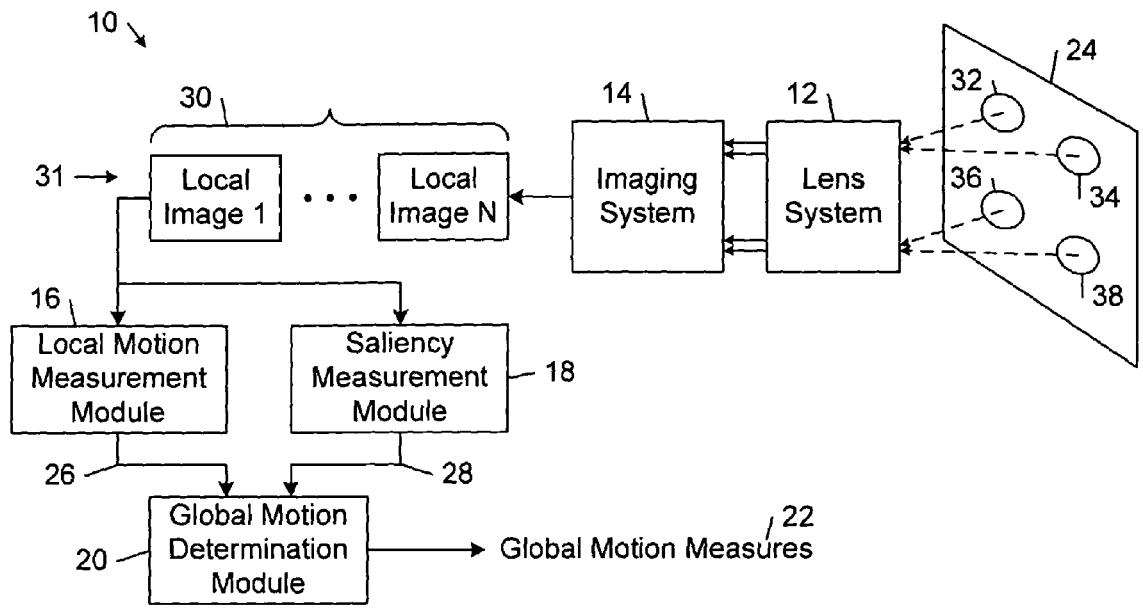
FIG. 1 is a block diagram of an embodiment of an optical motion sensing system.

FIG. 1 shows an embodiment of an optical motion sensing system 10 that includes a lens system 12, an imaging system 14, a local motion measurement system 16, a saliency measurement system 18, and a global motion determination system 20. The optical motion sensing system 10 is capable of producing global motion measures 22 that distinguish movements of the optical motion sensing system 10 from movements of objects appearing in a scene 24 being imaged by the imaging system 14. As explained in detail below, the optical motion sensing system 10 distinguishes these types of motion based upon an analysis of local motion measures 26 and saliency measures 28 that are determined for a set 30 of contemporaneous local images 31 of subfields 32, 34, 36, 38 of the scene 24. In addition, by taking into account measures of saliency in selected ones of the local images 31 from which the global motion measures 22 are produced, the resulting global motion measures 22 are less likely to be influenced by erroneous indications that the image sensing system 10 is stationary.

The optical motion sensing system 10 may be implemented with relatively small and inexpensive components, making it highly suitable for incorporation in any type of device in which information about the movement of the device may be used advantageously (e.g., image deblurring, motion stabilization, and generating graphical user interface control signals). In some embodiments, the optical motion sensing system 10 is incorporated in a mobile device, such as a cellular telephone, a cordless telephone, a portable memory device (e.g., a smart card), a personal digital assistant (PDA), a solid state digital audio player, a CD player, an MCD player, a still image, a video camera, a pc camera, a game controller, a pager, a laptop computer, and other embedded environments.

As explained in detail below, the global motion determination module 20 produces global motion measures 22 that describe the movement of the motion sensing system 10 (as opposed to motion of objects appearing in the scene). In this process, the global motion determination module 20 distinguishes scene changes that are due to movements of the motion sensing system 10 from scene changes that are due to movements of objects in the scene 22. In addition, the global motion determination module 20 screens out erroneous indications that the image sensing system is stationary based on the saliency measures 28 that are derived from the local images 31.

Figure 2:
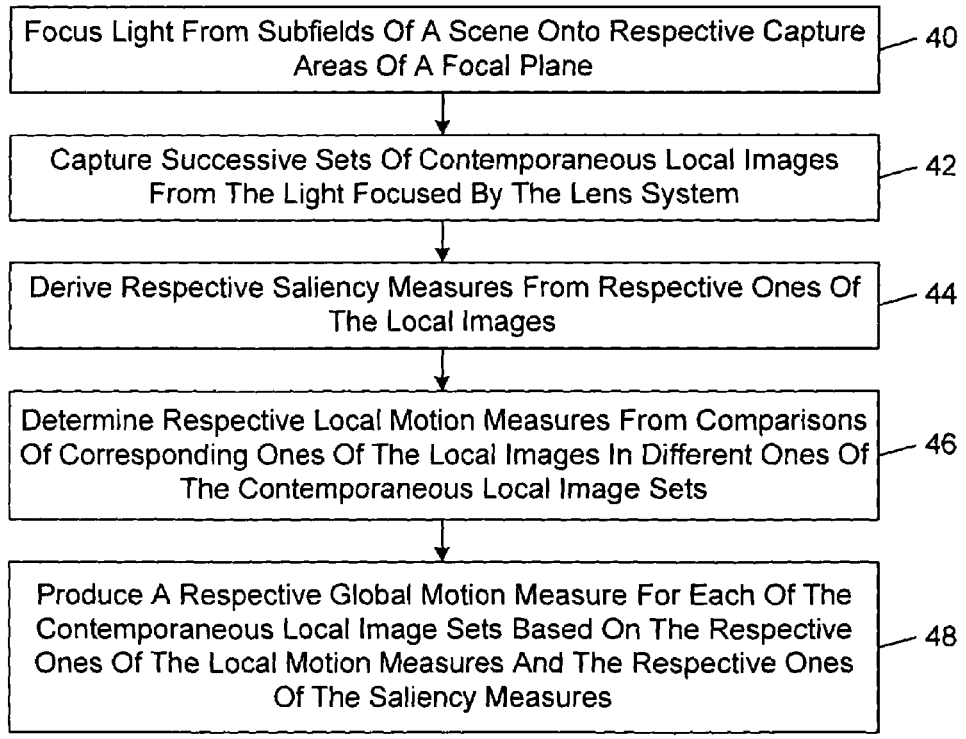
FIG. 2 is a flow diagram of an embodiment of an optical motion sensing method.

FIG. 2 shows an embodiment of a method by which the optical motion sensing system 10 produces the global motion measure 22 for the set 30 of contemporaneous local images 31 of the scene 24. In accordance with this method, the lens system 12 focuses light from the subfields 32-38 of the scene 24 onto respective capture areas of a focal plane (FIG. 2, block 40). The imaging system 14 captures successive sets 30 of contemporaneous local images 31 from the light that is focused by the lens system 12 (FIG. 2, block 42). The saliency measurement module 18 derives respective saliency measures 28 from respective ones of the local images 31 (FIG. 2, block 44). The local motion measurement module 16 determines respective local motion measures 26 from comparisons of corresponding ones of the local images 31 in different ones of the contemporaneous local image sets 30 (FIG. 2, block 46). The global motion determination module 20 produces a respective global motion measure 22 for each of the contemporaneous local image sets 30 based on the respective ones of the local motion measures 26 and the respective ones of the saliency measures 28 (FIG. 2, block 48).

In general, the local motion measurement module 16, the saliency measurement module 18, and the global motion determination module 20 may be implemented by one or more discrete modules of a processing system. These modules 16-20 are not limited to any particular hardware, firmware, or software configuration. Instead, these modules 16-20 may be implemented in any computing or data processing environment, including in digital electronic circuitry (e.g., an application-specific integrated circuit, such as a digital signal processor (DSP)) or in computer hardware, firmware, device driver, or software. In some implementations, computer process instructions for implementing the motion sensing method shown in FIG. 2 and the data it generates are stored in one or more machine-readable media. Storage devices suitable for tangibly embodying these instructions and data include all forms of non-volatile memory, including, for example, semiconductor memory devices, such as EPROM, EEPROM, and flash memory devices, magnetic disks such as internal hard disks and removable hard disks, magneto-optical disks, and CD-ROM.

II. Exemplary Embodiments of the Lens System and the Imaging System

In general, the lens system 12 focuses light from at least two subfields of the scene 24 onto respective captures areas in the focal plane, where each subfield corresponds to a different portion of the scene 24. In a typical embodiment, the lens system 12 includes a planar array of lenses each of which focuses light from a respective one of the subfields onto a respective one of the capture areas in the focal plane. The lens system 12 also may include additional optical components, such as additional lenses and optical filters.

The imaging system 14 may be any type of imaging device that is capable of capturing successive sets of contemporaneous local images from the subfield light that is focused by the lens system 12 onto the capture areas. As used herein, the term "contemporaneous" means that the local images 31 in a respective one of the contemporaneous local image sets 30 are captured during the same frame period (or readout cycle) of the imaging system 14. The contemporaneous local images 31 may be captured simultaneously or they may be captured sequentially during the same frame period. The set 30 of contemporaneous local images 31 may be output from the imaging system 14 serially or in parallel. The imaging system typically captures each set 30 of contemporaneous local images 31 at a rate (e.g., 1500 pictures or frames per second or greater) that is fast enough so that sequential images of each subfield of the scene overlap.

The imaging system 14 may be implemented using any type of image sensor technology, including charge coupled device (CCD) image sensor technology or complementary metal-oxide-semiconductor (CMOS) image sensor technology. In general, the imaging system 14 includes at least one image sensing component with a respective light sensing active area that includes one or more arrays of pixels. The pixels are divided into groups, where each pixel group captures local images from a respective one of the capture areas in the focal plane of the lens system 12. In some embodiments, the groups of pixels are divided electronically during readout of the pixel values. In other embodiments, the groups of pixels are divided spatially into discrete regions that are distributed across a common substrate (e.g., a silicon chip or a printed circuit board) at locations that are coincident with the capture areas. The imaging system 14 also may include additional components, such as a still image processing pipeline or a video processing pipeline, that perform one or more front-end operations on the captured image data (e.g., down-sampling, demosaicing, and color-correcting).

Figure 3A:
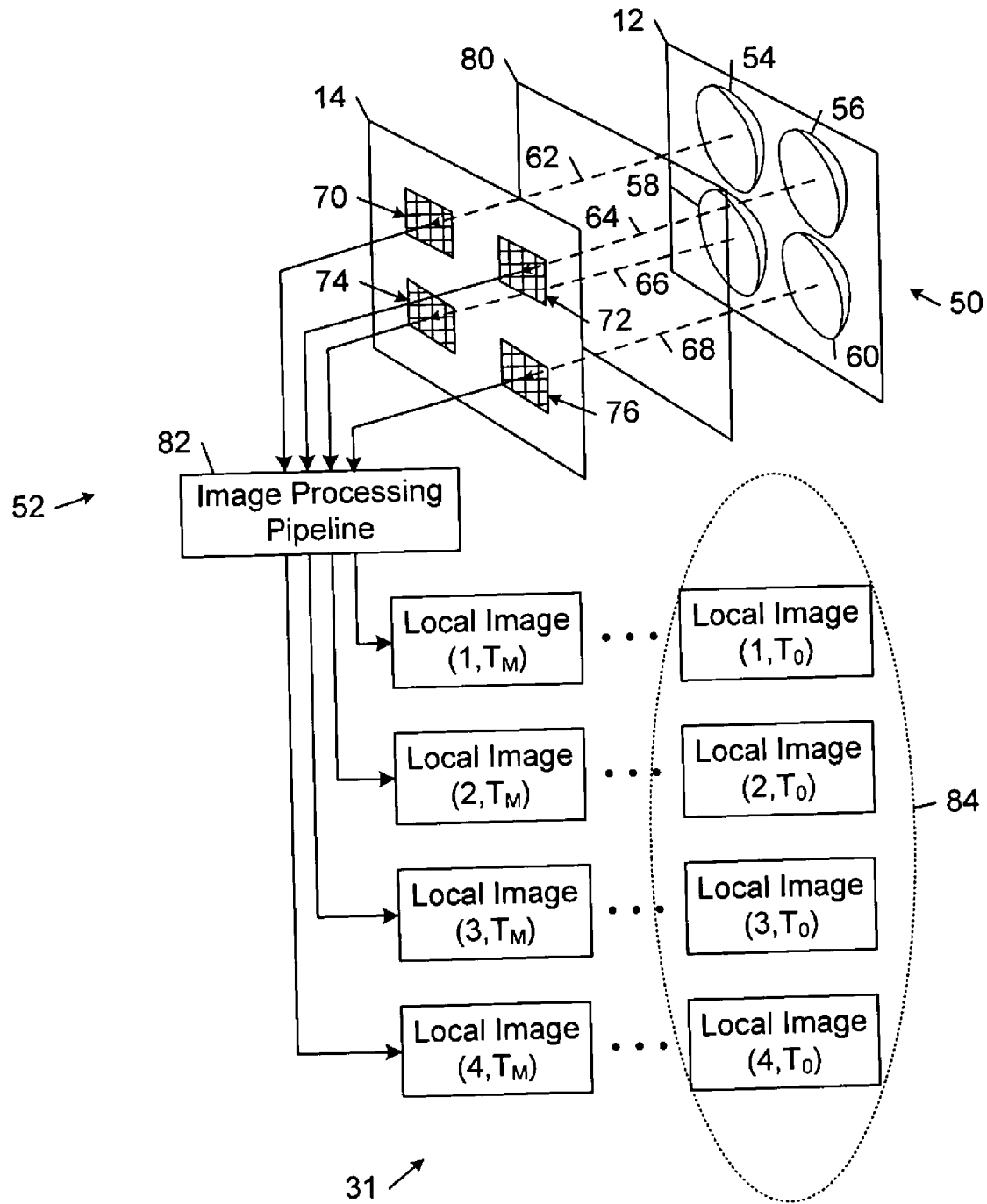
FIG. 3A is a diagrammatic view of an embodiment of the lens system and the imaging system of the optical motion sensing system shown in FIG. 1.

FIG. 3A shows an exemplary embodiment 50 of the lens system 12 and an exemplary embodiment 52 of the imaging system 14.

The lens system 50 includes a planar array of optical elements 54, 56, 58, 60. In general, the optical elements 54-60 may be any type of optical element that is capable of focusing light onto the capture areas of the focal plane. Exemplary types of optical elements include replicated epoxy lenses and diffractive optical elements (DOEs), such as a computer generated holograms (CGH) and gratings. Each of the lenses 54-60 has a respective optical axis 62, 64, 66, 68.

The imaging system 52 includes a planar array of pixels that are clustered into spatially separated groups 70, 72, 74, 76. Each pixel group typically includes two or more constituent pixels. Exemplary numbers of pixels in each pixel group are P×Q pixels, where each of P and Q has an integer value in a range from two to twenty. Each of the pixel groups 70-76 in the clustered planar array 71 is aligned with a respective one of the optical elements 54-60 of the lens system 50. In operation, each of the optical elements 54-60 is configured to focus incoming light 78 from the subfields of the scene onto the pixels of the corresponding cluster 70-76, as shown diagrammatically in FIG. 3B.

In the embodiment illustrated in FIG. 3A, the lens system 50 includes four optical elements 54-60 and the imaging system 52 includes four pixel groups 70-76. Other embodiments may include a larger or smaller number of pairs of optical elements and pixel groups.

Figure 3B:
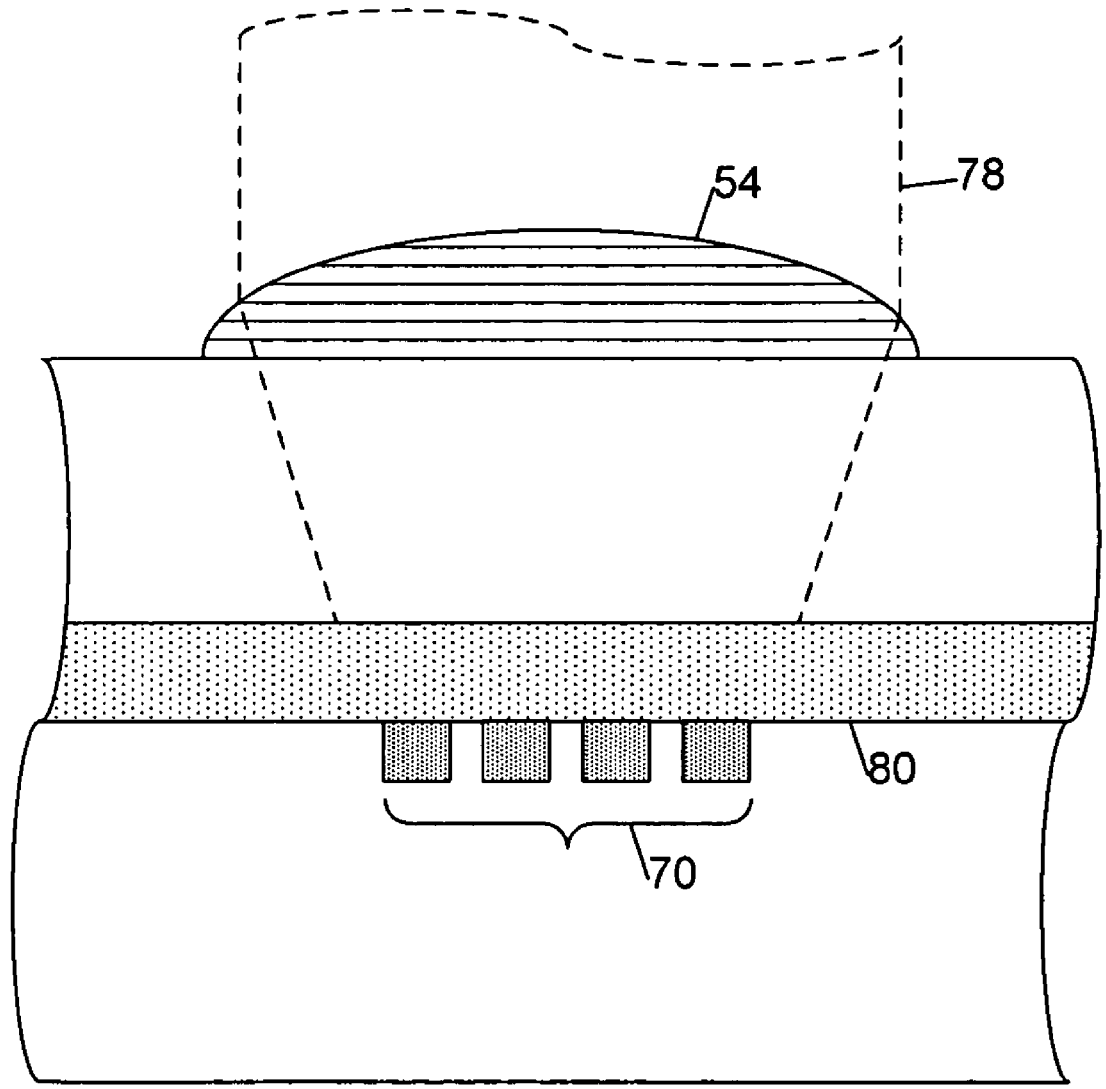
FIG. 3B is a diagrammatic sectional view of a portion of an embodiment of the lens system and the imaging system shown in FIG. 3A.

In the exemplary embodiment shown in FIGS. 3A and 3B, an optional optical filter 80 interposes the lens system 50 and the imaging system 52. In general, the optical filter 80 may be any type of filter that selectively transmits light that has one or more target properties, including a color filter, an absorptive filter, a reflective filter, a monochromatic filter, an infrared filter, a ultraviolet filter, a neutral density filter, a long pass filter, and a short pass filter. The lens system 50, the optical filter 80, and the imaging system 52 may be integrated into a monolithic structure as shown in FIG. 3B, or they may be implemented by discrete components that are held together by a support frame or mounted in a common housing.

The imaging system 52 additionally includes an image processing pipeline 82 that converts the raw image data that is produced by the pixel groups 70-76 into the local images 31. The image processing pipeline 82 may be a still image processing pipeline or a video processing pipeline, depending on the application environment in which the optical motion sensing system 10 is implemented. In the process of converting the raw image data into the local images 31, the image processing pipeline 82 may perform one or more front-end operations on the captured image data, including down-sampling, demosaicing, and color-correcting.

As shown in FIG. 3A, the image processing pipeline 82 generates a series of local images from the subfield light that is focused onto each pixel group 70-76. In particular, the image processing pipeline 82 generates: the series "Local Image $(1,T_0)$", . . . , "Local Image $(1,T_M)$" from the image data produced by pixel group 76; the series "Local Image $(2,T_0)$", . . . , "Local Image $(2,T_M)$" from the image data received from pixel group 74; the series "Local Image $(3,T_0)$", . . . , "Local Image $(3,T_M)$" from the image data produced by pixel group 72; and the series "Local Image $(4,T_0)$", . . . , "Local Image $(4,T_M)$" from the image data produced by pixel group 70. During each frame period, the image processing pipeline 82 generates a respective local image from the image data produced by each of the pixel groups 70-76. Thus, for example, during frame period $T_0$ the image processing pipeline 82 generates "Local Image $(1,T_0)$", "Local Image $(2,T_0)$", "Local Image $(3,T_0)$", and "Local Image $(4,T_0)$" from the image data respective produced by the pixel groups 70-76. As explained above, the local images that are captured during the same frame period constitute a set of contemporaneous local images. Therefore, "Local Image $(1,T_0)$", "Local Image $(2,T_0)$", "Local Image $(3,T_0)$", and "Local Image $(4,T_0)$" constitute a set 84 of contemporaneous local images that were captured during frame period $T_0$. Similarly, "Local Image $(1,T_M)$", "Local Image $(2,T_M)$", "Local Image $(3,T_M)$", and "Local Image $(4,T_M)$" constitute another set of contemporaneous local images that were captured during frame period $T_M$.

III. Exemplary Embodiments of the Saliency Measurement System

In general, the saliency measurement module 18 derives from respective ones of the local images 31 saliency measures 26 that provide a basis for assessing the visual quality of the corresponding local images 31. In particular, the saliency measures 26 provide an independent measure for assessing the accuracy of the local motion measures 26. Based on this assessment, the global motion determination module 20 ascertains the respective weights (e.g., no weight or full weight) that should be given to selected ones of the local motion measures 26 in the determination of the global motion measures 22.

In some embodiments, the saliency measures describe the quality of the features (e.g., texture, edges, corners, and other structural elements) in the local images. In these embodiments, the saliency measures 26 provide a basis for determining whether the local motion measurement module 16 generates a local motion measure that corresponds to zero motion because there is in fact no relative motion between the corresponding subfield and the optical motion sensing system 10 or because there are insufficient features in the local image (e.g., due to the absence of features in the scene itself or due lack of proper focus) to detect any motion.

In some embodiments, the saliency measurement module 18 derives the saliency measures 28 by applying one or more saliency feature descriptor functions to respective ones of the local images 31. In general, any one or more of a wide variety of different types of feature descriptors may be used to describe the local image content within the local images 31. The feature descriptors may be statistical, structural, or syntactic. Exemplary types of feature descriptors include: the level of contrast in the local images 31; the magnitude (amplitude) of pixel values in the local images 31; the energy of pixel values in the local images 31; the standard deviation of pixel values in the local images 31; the skewness of the gradient value distribution in the local images 31; and the edge frequency in the local images 31. The feature descriptors may be applied to individual pixels, local regions (e.g., block of 5×5 pixels), or all of the pixels of the local images 31.

In some embodiments, each of the saliency measures 28 describes a respective level of contrast in the corresponding local image 31. In these embodiments, the corresponding local image 31 is passed through a high-pass spatial filter and the contrast level corresponds to a count of the pixels in the high-pass filter output that are above a specified threshold.

In other embodiments, each of the saliency measures describes a respective edge frequency in the corresponding local image 31. In these embodiments, the saliency measurement module 18 may use any type of edge detection technique to find edges in the local images 31. In one exemplary embodiment, the saliency measurement module 18 uses a Sobel edge detector to compute edge directions and magnitudes. The Sobel edge detector uses a pair of 3×3 convolution masks to perform a two-dimensional gradient measurement on the local images 31, where one of the convolution masks estimates the gradient in the x-direction (columns) and the other convolution mask estimates the gradient in the y-direction (rows).

IV. Exemplary Embodiments of the Local Motion Measurement Module

In general, the local motion measurement module 16 may use any of a wide variety of different methods to determine the local motion measures 26. The local motion measurement module 16 generates the local motion measures 26 based on comparisons of successive ones of the local images generated by the imaging system 14 in response to the light received from each of the subfields 32-38. In some embodiments, the local motion measurement module 16 identifies texture or other features in corresponding ones of the images 31 in successive ones of the contemporaneous local image sets 30 and tracks the motion of such features across the sequence of corresponding images. In some implementations, the local motion measurement module 16 correlates the features that are identified in successive images to obtain information relating to the position of the motion sensing system 10 relative to the scene 22. In some embodiments, the local motion measurement module 16 identifies common features in sequential images and determines the direction and distance by which the identified common features are shifted or displaced. In some of these embodiments, the local motion measurement module 16 translates the displacement information into two-dimensional position coordinates (e.g., X and Y coordinates) that correspond to the relative position of the motion sensing system 10.

V. Producing Global Motion Measures

The global motion determination module 20 produces global motion measures 22 that describe the movements of the motion sensing system 10. In this process, the global motion determination module 20 distinguishes scene changes that are due to movements of the motion sensing system 10 from scene changes that are due to movements of objects in the scene 22 and additionally screens out erroneous indications that the image sensing system 10 is stationary.

Figure 4:
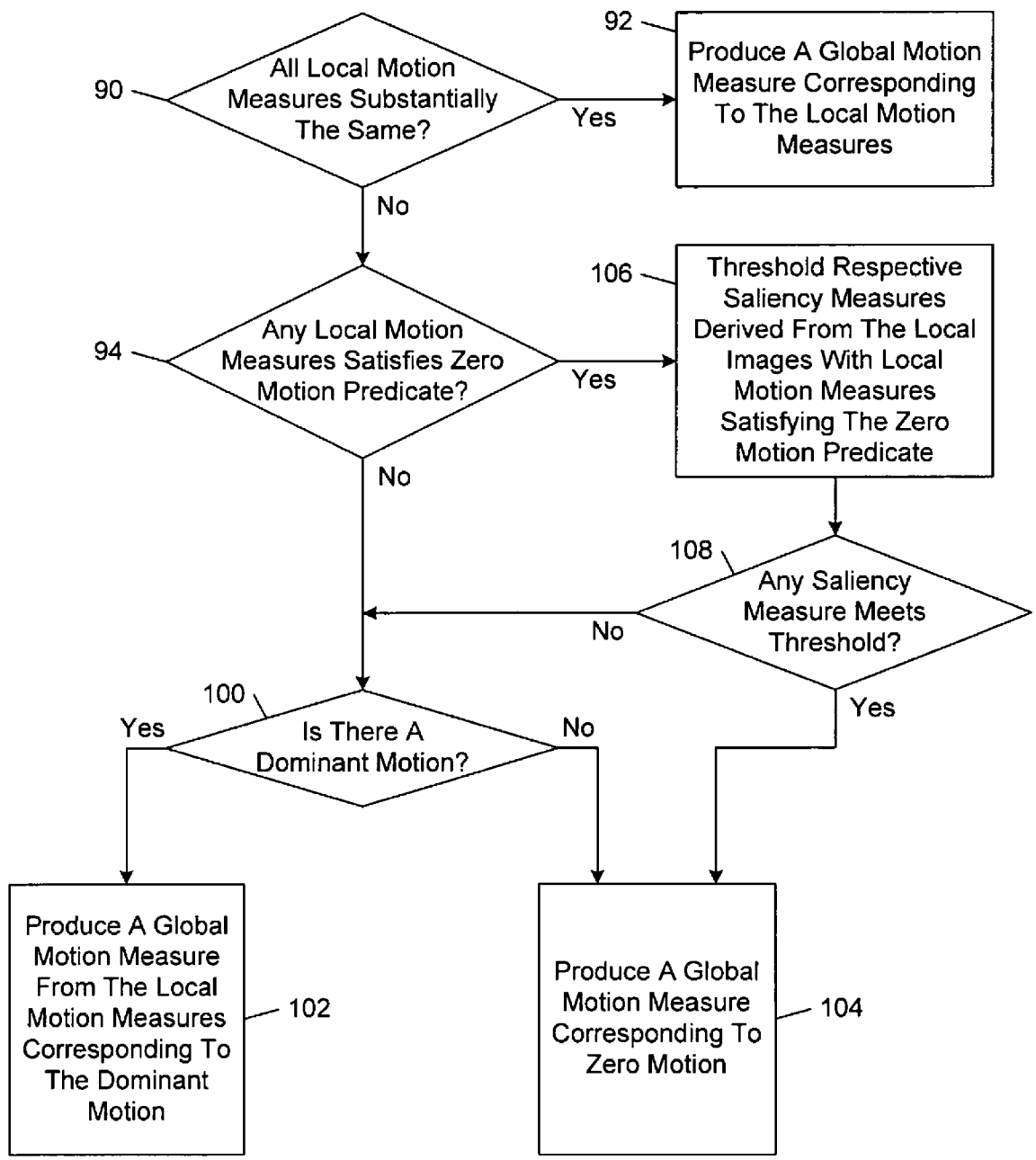
FIG. 4 is a flow diagram of an embodiment of a method of producing a global motion measure based on local motion measures and saliency measures.

FIG. 4 shows an embodiment of a method that is executed by an embodiment of the global motion determination module 20 to produce a respective global motion measure 22 for each of the contemporaneous local image sets 30.

In accordance with this embodiment, the global motion determination module 20 determines whether all the local motion measures 26 that are determined for a respective one of the contemporaneous local image sets 30 are substantially the same (FIG. 4, block 90). In general, the global motion determination module 20 may make this determination using any of a wide variety of different methods of assessing the degree of sameness of the local motion measures 26. The global motion determination module 20 may determine whether the local motion measures 26 are substantially the same in terms of direction alone or in terms of both direction and magnitude.

In some embodiments, the global motion determination module 20 quantizes the local motion measures 26 into direction classes and determines that the local motion measures are substantially the same when they are quantized into the same quantization class. In one exemplary embodiment, the global motion determination module 20 quantizes the local motion measures 26 into the following direction classes: right (0°), right up (45°), up (90°), left up (135°), left (180°), left down (225°), down (270°), and right down (315°). In some embodiments, the global motion determination module 20 quantizes the local motion measures 26 into direction and magnitude classes and determines that the local motion measures are substantially the same when they are quantized into the same direction and magnitude quantization classes. In one exemplary embodiment, the global motion determination module 20 quantizes the local motion measures 26 into the direction classes described above and additionally quantizes the local motion measures 26 into the following magnitude classes for each of the horizontal and vertical directions of motion (e.g., along the x-axis and the y-axis): stationary, slow, medium, and fast.

In other embodiments, the global motion determination module 20 may determine that the local motion measures 26 are substantially the same when the standard deviation of their directions is below a threshold value. In still other embodiments, the global motion determination module 20 may determine that the local motion measures 26 are substantially the same when the standard deviation of their directions is below a first threshold value and the standard deviation of their magnitudes is below a second threshold value.

If all the local motion measures 26 are determined to be substantially the same (FIG. 4, block 90), the global motion determination module 20 produces a global motion measure 22 corresponding to the local motion measures (FIG. 4, block 92). In general, the global motion determination module 20 may determine the global motion measure 22 from the local motion measures 26 in any way that reflects the common motion that they describe. In some embodiments, the global motion determination module 20 produces the global motion measure 22 with a magnitude that corresponds to the average magnitude of the local motion measures 26 and a direction that corresponds to the average direction of the local motion measures 26.

If one or more of the local motion measures 26 are determined to be different from the others (FIG. 4, block 90), the global motion determination module 20 determines whether any of the local motion measures 26 satisfies a specified zero motion predicate (FIG. 4, block 94). The zero motion predicate defines or specifies one or more conditions on each of the local motion measures 26 for the optical motion sensor 10 to be considered in a stationary state in relation to the corresponding subfield of the scene. In one exemplary embodiment, a zero motion predicate $M_{zero}$ that defines the zero motion state for each of the local motion measures $\vec{r}$ is given by:

$$M_{zero} = \{|\vec{r}| \leq \Omega_{zero}\} \quad (1)$$

where $|\vec{r}|$ denotes the magnitude of the motion measure $\vec{r}$ (e.g., the magnitude of the displacement vector or the magnitude of the velocity vector) and $\Omega_{zero}$ is an empirically determined motion measure magnitude threshold at or below which the motion measure $\vec{r}$ is considered to be in the zero motion state.

If none of the local motion measures 26 satisfies the zero motion predicate (FIG. 4, block 94), the global motion determination module 20 determines whether there is a dominant motion among the local motion measures 26 (FIG. 4, block 100). In some embodiments, the global motion determination module 20 determines that there is a dominant motion if at least a specified proportion (e.g., more then 50%) of the local motion measures 26 are substantially the same. In some embodiments, the global motion determination module 20 determines whether the local motion measures 26 are substantially the same using one of the methods described above in connection with block 90.

If none of the local motion measures 26 satisfies the zero motion predicate (FIG. 4, block 94) and there is a dominant motion among the local motion measures 26 (FIG. 4, block 100), the global motion determination module 20 produces a global motion measure 22 from the local motion measures corresponding to the dominant motion (FIG. 4, block 102). In general, the global motion determination module 20 may determine the global motion measure 22 from the local measures corresponding to the dominant motion in any way that reflects the common motion that they describe. In some embodiments, the global motion determination module 20 produces the global motion measure 22 with a magnitude that corresponds to the average magnitude of the local motion measures corresponding to the dominant motion and a direction that corresponds to the average direction of the local motion measures corresponding to the dominant motion.

If none of the local motion measures 26 satisfies the zero motion predicate (FIG. 4, block 94) and there is no dominant motion among the local motion measures (FIG. 4, block 100), the global motion determination module 20 produces a global motion measure that corresponds to zero motion (FIG. 4, block 104). In general, the global motion determination module 20 may produce the global motion measure 22 with one or more values that corresponds to a zero motion state of the optical motion sensing system 10 in relation to the scene. In some embodiments, the global motion determination module 20 produces the global motion measure 22 with a magnitude of zero and a direction of zero.

If one or more of the local motion measures 26 satisfy the zero motion predicate in block 94, the global motion determination module 20 thresholds selected ones of the saliency measures 28 that are derived from ones of the local images that are associated with the local motion measures satisfying the zero motion predicate (FIG. 4, block 106). If any of the selected saliency measures 28 meet (e.g., greater than or at least equal to) the threshold (FIG. 4, block 108), the global motion determination module 20 produces a global motion measure that corresponds to zero motion (FIG. 4, block 104; described above). If none of the selected saliency measures 28 satisfies the threshold (FIG. 4, block 108), the global motion determination module 20 proceeds to block 100 (described above).

VI. Exemplary Operating Environments for the Motion Sensing System

As explained above, the motion sensing system 10 may be implemented with relatively small and inexpensive components, making it highly suitable for incorporation in any type of device in which information about the movement of the device may be used advantageously. In some embodiments, the optical motion sensing system 10 is incorporated in a mobile device, such as a cellular telephone, a cordless telephone, a portable memory device (e.g., a smart card), a personal digital assistant (PDA), a solid state digital audio player, a CD player, an MCD player, a still image, a video camera, a pc camera, a game controller, a pager, a laptop computer, and other embedded environments.

Figure 5:
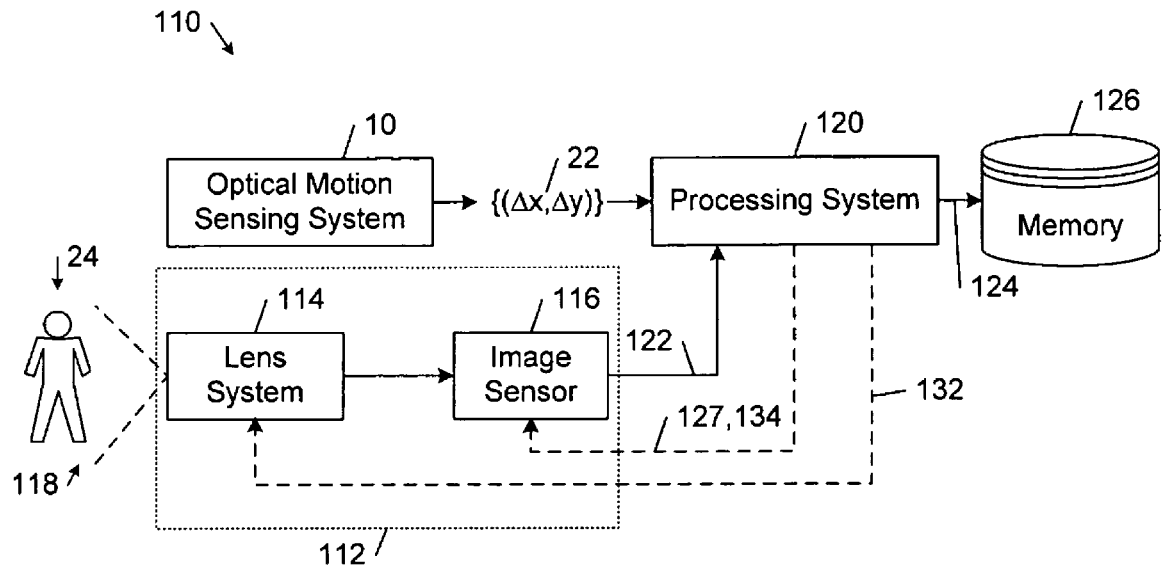
FIG. 5 is a block diagram of an embodiment of an apparatus that includes an embodiment of the optical motion sensing system shown in FIG. 1 and an image capture system.

FIG. 5 shows a block diagram of some of the components of an implementation of the portable electronic device 110 that includes the optical motion sensing system 10 and an image capture system 112. The image capture system 112 includes a lens system 114 and an image sensor 116. The lens system 114 has a field of view 118 that encompasses the subfields of the scene that are imaged by the optical motion sensing system 10. The lens system 114 focuses external light from the field of view 118 onto the capture plane of the image sensor 116, which may be any type of image sensor, including a CCD image sensor or a CMOS image sensor.

The optical motion sensing system 10 transmits the global motion measures 22 (e.g., $\{(\Delta x, \Delta y)\}$) describing the movement of the optical motion sensing system 10 in relation to the scene to a processing system 120. In some embodiments, the processing system 120 may be implemented by hardware components or by firmware components or by a combination of hardware and firmware components. The processing system 120 processes the images 122 that are captured by the image sensor 116 in any one of a wide variety of different ways. For example, the processing system 120 may demosaic and color-correct the images 122. The processing system 120 may generate compressed images 124 from the demosaiced and color-corrected images in accordance with an image compression process (e.g., JPEG). The compressed images 124 are stored in a memory 126 in the form of one or more discrete image files. The memory 126 may be implemented by any type of image storage technology, including a compact flash memory card and a digital video tape cassette. The image data that is stored in the memory 126 may be transferred to a storage device (e.g., a hard disk drive, a floppy disk drive, a CD-ROM drive, or a non-volatile data storage device) of an external processing system (e.g., a computer or workstation) via a cable port, a wireless communications port, or an RF antenna that is incorporated in the portable electronic device 110.

In some embodiments, the processing system 120 associates the images 122 that are captured by the image sensor 116 with the corresponding ones of the global motion measures 22 that are produced from ones of the local images 31 that were captured during the exposure periods of the corresponding images 122. The processing system 120 may store the global motion measures 22 in a header (e.g., an EXIF header) of the image files 124 that are stored in the memory 126 or in a separate data structure that is linked to the corresponding ones of the image files 124. In some embodiments, the global motion measures 22 are used by an image processing application to process the images 124 (e.g., to remove blurring or motion artifacts).

In some embodiments, the processing system 120 may use the global motion measures 22 (or motion measures derived from the global motion measures 22) to control how an image 124 is displayed (e.g., in a portrait orientation or a landscape orientation) on a display screen of the portable electronic device 110.

In some embodiments, the processing system 120 generates control signals 127 that cause the image sensor 116 to dynamically displace the pixel information (accumulated photogenerated charges) in directions and amounts that correspond to the global motion measures 22. In particular, the control signals 127 may direct the image sensor 116 to displace the individual pixel information in the capture plane of the image sensor 116 in a way that actively compensates for any movements of the image that is focused by the lens system 114 onto the capture plane. In this way, blurring and other motion-related artifacts that might otherwise be caused by vibrations of the portable electronic device 110 (e.g., hand shaking) may be reduced.

Figure 6:
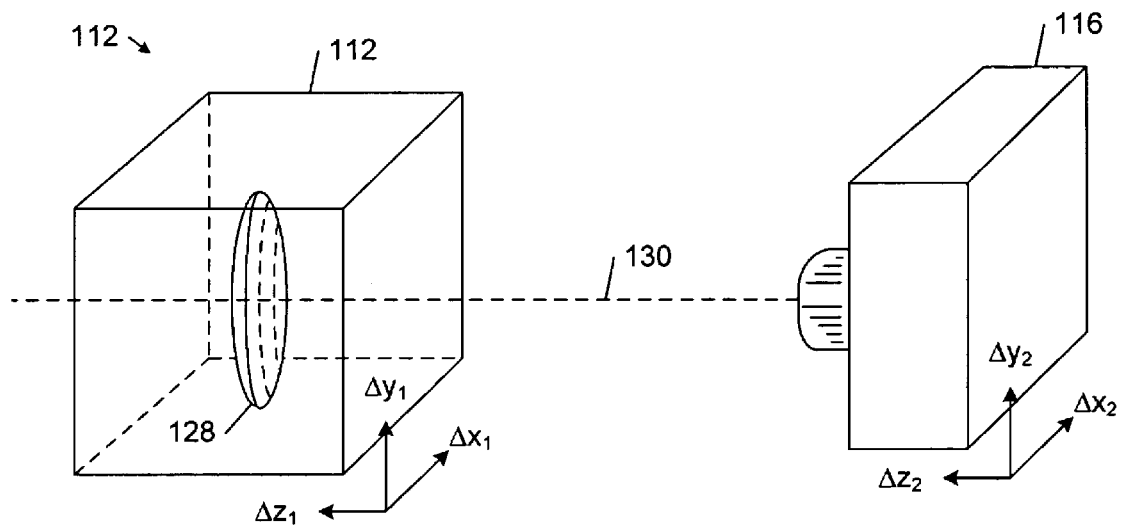
FIG. 6 is a diagrammatic view of embodiment of a lens system and an embodiment of the image capture system shown in FIG. 5.

FIG. 6 shows a portion of an embodiment of the image capture system 112 in which the lens system 114 includes one or more compensation optical components 128 that may be moved relative to the optical axis 130 by an amount ($\Delta x_1$, $\Delta y_1$, $\Delta z_1$) that adjusts the position of the image that is focused onto the capture plane of the image sensor 116 to compensate for any movement of the portable electronic device 110. In these embodiments, the processing system 120 generates control signals 132 that adjust the position of the compensation optical components 128 based on the global motion measures 22 that are determined by the optical sensing system 10. In this way, blurring and other motion-related artifacts that might otherwise be caused by vibrations of the portable electronic device 110 (e.g., hand shaking) may be reduced. The compensation optical components 128 may be moved using any type of precision-movement controllers (e.g., piezoelectric actuators).

In some implementations, the position of the image sensor 116 may be moved relative to the optical axis 130 by an amount ($\Delta x_2$, $\Delta y_2$, $\Delta z_2$) that adjusts the position of the image that is focused onto the capture plane of the image sensor 116 to compensate for any movement of the portable electronic device 110. In these embodiments, the processing system 120 generates control signals 134 that adjust the position of the image sensor 116 based on the global motion measures 22 that are determined by the processing system 120.

Figure 7:
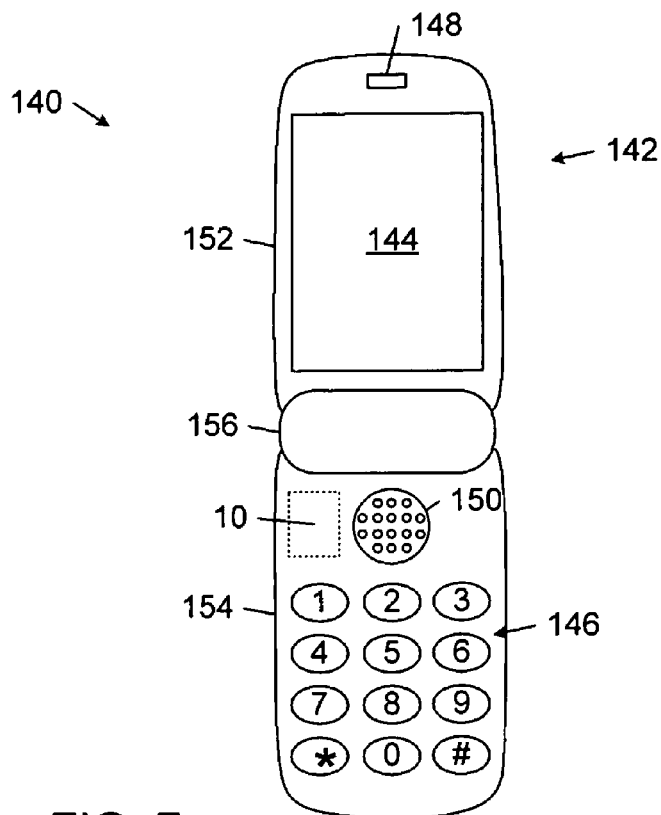
FIG. 7 is a diagrammatic top view of an embodiment of a portable electronic device in an open state.
Figure 8:
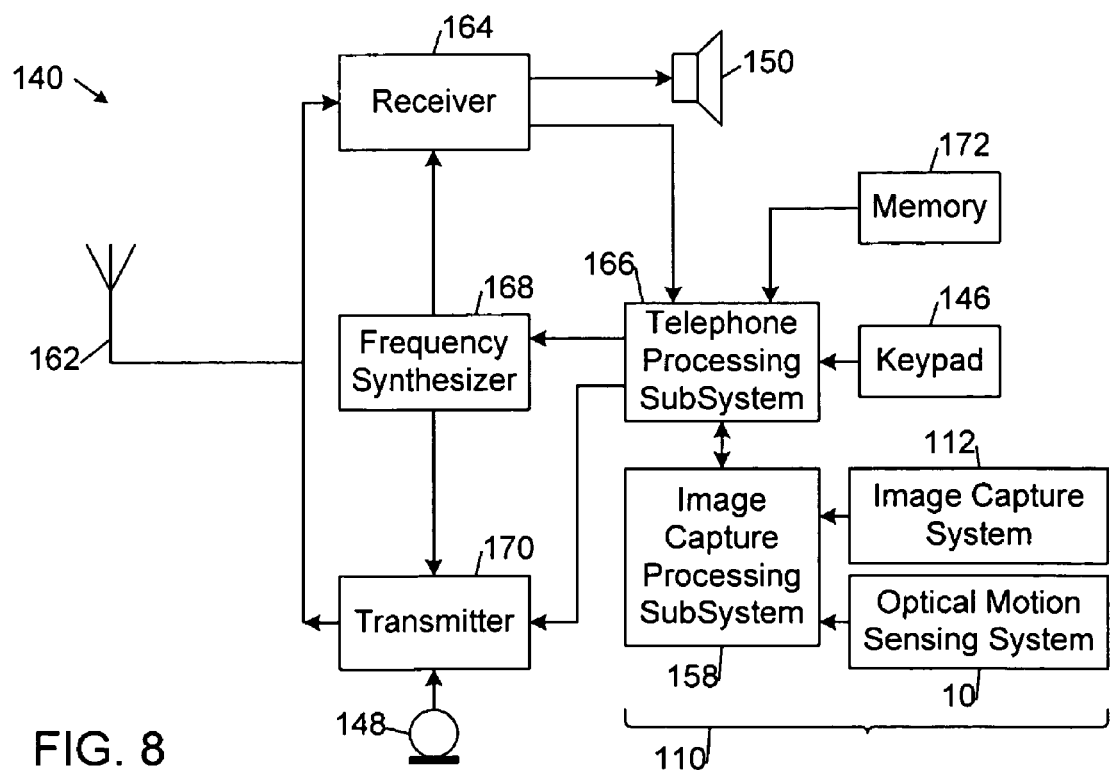
FIG. 8 is a block diagram of an embodiment of the image capture system and the optical motion sensing system shown in FIG. 1 integrated with a telephone subsystem within the housing of the portable electronic device shown in FIG. 7.

FIGS. 7 and 8 show an embodiment 140 of the portable electronic device 110 that includes the optical motion sensing system 10, the image capture system 112, and a telephone subsystem. The portable electronic device 140 may be, for example, a cellular telephone, a cordless telephone, or other telephony-enabled portable electronic device. The telephone subsystem may correspond to any of a variety of different types of telephones, including a wired telephone and a wireless telephone (e.g., a cellular telephone and a cordless telephone). The telephone subsystem converts sounds into electrical signals and vice versa. In particular, the telephone subsystem transduces between audio signals and telephony signals. In this regard, the telephone subsystem typically includes a microphone for converting received audio signals into electrical signals and a speaker for converting received electrical signals into audio signals. The telephone subsystem communicates the telephony signals over a telephony communications channel. The telephony signals may formatted in accordance with any of a variety of different telephone protocols, including public switched telephone network protocols (e.g., Signaling System 7 and Intelligent Network), analog cellular telephone protocols (e.g., Advanced Mobile Phone Service), digital cellular telephone protocols (e.g., TDMA, CDMA, GSM, and WAP), and cordless telephone protocols (e.g., Digital Enhanced Cordless Telecommunications). The telephony communications channel couples the handheld device to a telephone system, which may include one or more of a wireless telephone network, a wired telephone network (e.g., a PSTN), and a cordless telephone base station.

As shown in FIG. 7, the handheld device 140 includes a housing 142, a display screen 144, a keypad 146, a microphone 148, and a speaker 150. The display screen 142 and the microphone 148 are exposed through an inner face of a top part 152 of the housing 142. The keypad 146 and the speaker 150 are exposed through an inner face of a bottom part 154 of the housing 142. The top and bottom parts 152, 154 of the housing 142 are connected together by a hinged portion 156, which allows the top and bottom parts 142, 144 to pivot between an open state and a closed state. In the open state shown in FIG. 7, a user has access to the displays screen 144, the keypad 146, the microphone 148, and the speaker 150.

FIG. 8 shows some of the internal components of an embodiment of the handheld device 140, including the optical motion sensing system 10 and the image capture system 112, which are integrated inside the housing 142. In this embodiment, the image capture processing subsystem 158 corresponds to the processing system 120 shown in FIG. 5. The telephone subsystem includes an antenna 162, a receiver 164, the speaker 150, a telephone processing subsystem 166, a frequency synthesizer 168, a transmitter 170, the microphone 148, the keypad 146, and a memory 172. The telephone processing subsystem 166 choreographs the operation of the receiver 164, the transmitter 170, and the frequency synthesizer 168. The frequency synthesizer 168 controls the operating frequencies of the receiver 164 and the transmitter 170, and generates electronic radio frequency signals in response to control signals received from the telephone processing subsystem 166.

VII. Conclusion

The embodiments that are described in detail herein are capable of producing global motion measures that distinguish movements of the optical motion sensing system 10 from movements of objects appearing in a scene 24 being imaged by the imaging system 14. In addition, by taking into account measures of saliency in selected ones of the local images from which the global motion measures are produced, the resulting global motion measures are less likely to be influenced by erroneous indications that the image sensing system is stationary.

Other embodiments are within the scope of the claims.

What is claimed is:

1. An apparatus, comprising:
 a lens system operable to focus light from subfields of a scene onto respective capture areas of a focal plane;
 an imaging system having active regions each coincident with a respective one of the capture areas in the focal plane, the active regions being operable to cooperatively capture successive sets of contemporaneous local images from the light focused by the lens system;
 a saliency measurement module operable to derive respective saliency measures from respective ones of the local images;
 a local motion measurement module operable to determine respective local motion measures from comparisons of corresponding ones of the local images in ones of the contemporaneous local image sets; and
 a global motion determination module operable to classify the local motion measures into a plurality of quantization classes and to produce a respective global motion measure for each of the contemporaneous local image sets based on the respective ones of the local motion measures and the respective ones of the saliency measures.

2. The apparatus of claim 1, wherein the lens system comprises a planar array of lenses, each of the lenses being operable to focus the light from a respective one of the subfields onto a respective one of the capture areas.

3. The apparatus of claim 1, wherein the saliency measurement module is operable to derive the saliency measures based on measures of contrast in the respective ones of the local images.

4. The apparatus of claim 1, wherein the local motion measurement module is operable to determine the local motion measures by correlating features across corresponding ones of the local images in successive ones of the contemporaneous local image sets.

5. The apparatus of claim 1, wherein
in response to a determination that all the local motion measures determined for the local images in a given one of the contemporaneous local image sets are substantially the same, the global motion determination module produces the global motion measure for the given contemporaneous local image set from all the local motion measures.

6. The apparatus of claim 1, wherein
in response to a determination that none of the local motion measures determined for the local images in a given one of the contemporaneous local image sets satisfies a zero motion predicate defining one or more criteria for a state of zero relative motion between the imaging system and the scene, the global motion determination module identifies ones of the local motion measures corresponding to a dominant motion for the given contemporaneous local image set and produces the global motion measure for the given contemporaneous image set from the identified ones of the local motion measures.

7. The apparatus of claim 1, wherein
in response to a determination that one or more of the local motion measures determined for one or more corresponding ones the local images in a given one of the contemporaneous local image sets satisfies a zero motion predicate defining one or more criteria for a state of zero relative motion between the imaging system and the scene, the saliency measurement module computes respective ones of the saliency measures from the corresponding ones of the local images.

8. The apparatus of claim 7, wherein
in response to a determination that at least one of the computed saliency measures fails to satisfy a saliency threshold, the global motion determination module produces the global motion measure for the given contemporaneous local image set with a value indicative of a state of zero relative motion between the imaging system and the scene.

9. The system of claim 1, wherein each saliency measure describes a level of quality of at least one feature within the respective ones of the local images.

10. The system of claim 3, wherein the saliency measurement module comprises a high-pass spatial filter to generate a high-pass filter output, wherein the saliency measurement module is further operable to derive the saliency measures based on a contrast level which corresponds to a count of pixels in the high-pass filter output that are above a specified contrast threshold.

11. The system of claim 1, wherein the global motion determination module is further operable to classify the location motion measures into a plurality of direction quantization classes and a plurality of magnitude quantization classes, wherein the direction quantization classes correlate with directions within a plane, and the magnitude quantization classes correlate with a plurality of speeds for each direction quantization class.

12. A method, comprising:
focusing light from subfields of a scene onto respective capture areas of a focal plane;
capturing successive sets of contemporaneous local images from the focused light;
deriving respective saliency measures from respective ones of the local images;
determining respective local motion measures from comparisons of corresponding ones of the local images in ones of the contemporaneous local image sets;
classifying the local motion measures into a plurality of quantization classes; and
producing a respective global motion measure for each of the contemporaneous local image sets based on the respective ones of the local motion measures and the respective ones of the saliency measures.

13. The method of claim 12, wherein the deriving comprises deriving the saliency measures based on measures of contrast in the respective ones of the local images.

14. The method of claim 12, wherein
in response to a determination that all the local motion measures determined for the local images in a given one of the contemporaneous local image sets are substantially the same, the producing comprises determining the global motion measure for the given contemporaneous local image set from all the local motion measures.

15. The method of claim 12, wherein
in response to a determination that none of the local motion measures determined for the local images in a given one of the contemporaneous local image sets satisfies a zero motion predicate defining one or more criteria for a state of zero motion relative to the scene, the producing comprises identifying ones of the local motion measures corresponding to a dominant motion for the given contemporaneous local image set and producing the global motion measure for the given contemporaneous image set from the identified ones of the local motion measures.

16. The method of claim 12, wherein
in response to a determination that one or more of the local motion measures determined for one or more corresponding ones the local images in a given one of the contemporaneous local image sets satisfies a zero motion predicate defining one or more criteria for a state of zero motion relative to the scene, the deriving comprises computing respective ones of the saliency measures from the corresponding ones of the local images.

17. The method of claim 16, wherein
in response to a determination that at least one of the computed saliency measures fails to satisfy a saliency threshold, the producing comprises producing the global motion measure for the given contemporaneous local image set with a value indicative of a state of zero motion relative to the scene.

18. A system comprising, comprising:
means for focusing light from subfields of a scene onto respective capture areas of a focal plane;
means for capturing successive sets of contemporaneous local images from the light focused by the lens system;
means for deriving respective saliency measures from respective ones of the local images;
means for determining respective local motion measures from comparisons of corresponding ones of the local images in ones of the contemporaneous local image sets;
means for classifying the local motion measures into a plurality of quantization classes; and means for producing a respective global motion measure for each of the contemporaneous local image sets based on the respective ones of the local motion measures and the respective ones of the saliency measures.

19. The system of claim 18, wherein in response to a determination that one or more of the local motion measures determined for one or more corresponding ones the local images in a given one of the contemporaneous local image sets satisfies a zero motion predicate defining one or more criteria for a state of zero relative motion between the imaging system and the scene, the deriving means computes respective ones of the saliency measures from the corresponding ones of the local images.

20. The system of claim 19, wherein in response to a determination that at least one of the computed saliency measures fails to satisfy a saliency threshold, the determining means produces the global motion measure for the given contemporaneous local image set with a value indicative of a state of zero relative motion between the imaging system and the scene.

* * * * *